United States Patent
Akita et al.

(10) Patent No.: US 9,238,454 B2
(45) Date of Patent: Jan. 19, 2016

(54) BRAKE CONTROL SYSTEM

(75) Inventors: Kumiko Akita, Miyoshi (JP); Takayuki Yamamoto, Nagakute (JP); Tetsuya Miyazaki, Toyota (JP); Terushige Uraoka, Kariya (JP); Koji Watanabe, Kariya (JP)

(73) Assignees: TOYOTA JIDOSHA KABUSHIKI KAISHA, Toyota-shi (JP); ADVICS CO., LTD., Kariya (JP)

( * ) Notice: Subject to any disclaimer, the term of this patent is extended or adjusted under 35 U.S.C. 154(b) by 687 days.

(21) Appl. No.: 13/578,734

(22) PCT Filed: Feb. 4, 2011

(86) PCT No.: PCT/IB2011/000186
§ 371 (c)(1),
(2), (4) Date: Aug. 13, 2012

(87) PCT Pub. No.: WO2011/098877
PCT Pub. Date: Aug. 18, 2011

(65) Prior Publication Data
US 2012/0319462 A1 Dec. 20, 2012

(30) Foreign Application Priority Data
Feb. 12, 2010 (JP) .................... 2010-029111

(51) Int. Cl.
*B60T 17/18* (2006.01)
*B60T 13/68* (2006.01)
(Continued)

(52) U.S. Cl.
CPC ............. *B60T 13/686* (2013.01); *B60T 8/4081* (2013.01); *B60T 13/165* (2013.01); *B60T 13/662* (2013.01)

(58) Field of Classification Search
CPC ........ B60T 8/1881; B60T 8/341; B60T 8/885
USPC ..................... 303/2, 10, 20, 122.12, 122.05
See application file for complete search history.

(56) References Cited

U.S. PATENT DOCUMENTS 5,795,036 A 8/1998 Campagnolo
5,795,039 A 8/1998 Fennel et al.
(Continued)

FOREIGN PATENT DOCUMENTS

DE 199 61 469 7/2000
DE 103 54 279 7/2004
(Continued)

OTHER PUBLICATIONS

International Search Report Issued Jul. 18, 2011 in PCT/IB11/00186 Filed Feb. 4, 2011.

*Primary Examiner* — Robert A Siconolfi
*Assistant Examiner* — Mahbubur Rashid
(74) *Attorney, Agent, or Firm* — Oblon, McClelland, Maier & Neustadt, L.L.P.

(57) ABSTRACT

In a brake control system, a power supply portion supplies a voltage to a plurality of actuators. When a first actuator is supplied with a voltage equal to or higher than a first minimum operating voltage from the power supply portion, the first actuator operates to perform a first function. When a second actuator is supplied with a voltage equal to or higher than a second minimum operating voltage from the power supply portion, the second actuator performs a second function. The first minimum operating voltage and the second minimum operating voltage are set to be different from each other by a predetermined value so that the first actuator and the second actuator stop operating in a predetermined sequence with a decrease in the supplied voltage.

8 Claims, 4 Drawing Sheets (51) Int. Cl.
  *B60T 8/40* (2006.01)
  *B60T 13/16* (2006.01)
  *B60T 13/66* (2006.01)

(56) References Cited

U.S. PATENT DOCUMENTS

| | | | |
|---|---|---|---|
| 6,199,957 | B1 | 3/2001 | Soga |
| 6,238,016 | B1 | 5/2001 | Soga |
| 6,692,088 | B1 * | 2/2004 | Zheng ..................... 303/113.1 |
| 2004/0155624 | A1 | 8/2004 | Amano et al. |
| 2005/0063117 | A1 | 3/2005 | Amano et al. |
| 2006/0214505 | A1 * | 9/2006 | Yamaguchi et al. ....... 303/116.1 |
| 2008/0231108 | A1 * | 9/2008 | Attallah et al. ................... 303/3 |
| 2009/0240412 | A1 * | 9/2009 | Cahill ............................. 701/70 |

FOREIGN PATENT DOCUMENTS

| | | |
|---|---|---|
| EP | 1 013 529 | 6/2000 |
| JP | 10 503446 | 3/1998 |
| JP | 2007-203892 A | 8/2007 |
| WO | 2006 032658 | 3/2006 |

* cited by examiner

FIG.1

BRAKE CONTROL SYSTEM

INCORPORATION BY REFERENCE

This document claims priority to Japanese Application No. 2010-029111, filed on Feb. 2, 2010, the entire content of which is hereby incorporated by reference.

BACKGROUND OF THE INVENTION

1. Field of the Invention

The invention relates to a brake control system that applies braking forces to wheels.

2. Description of the Related Art

Recently, electronic brake control systems have been provided in vehicles. The brake control system controls braking forces for wheels so that the optimum braking forces are applied to the vehicle according to a situation in which the vehicle is traveling. In the brake control system, wheel cylinder pressures for the wheels are monitored using pressure sensors, and electromagnetic valves are controlled so that the wheel cylinder pressures are equal to target hydraulic pressures calculated based on the amount by which a driver depresses a brake pedal.

In the brake control system, pumps are used to increase the hydraulic pressures, and the electromagnetic valves are used to control the hydraulic pressures. The actuators, such as the pumps and the electromagnetic valves, operate using power from a battery that functions as a power supply. Therefore, it is necessary to examine how the brake control system should execute a brake control if a voltage decreases due to a malfunction of the battery.

Published Japanese Translation of PCT application No. 10-503446 (JP-A-10-503446) describes a circuit for a brake system that executes an electrical control of braking force distribution. In the circuit, the function for executing the electrical braking force distribution control is maintained until the voltage of a power supply falls below a predetermined limit value. In contrast, the function of the Antilock Brake System (ABS) and the function of the Traction Control System (TCS) are suppressed.

In the technology described in Published Japanese Translation of PCT application No. 10-503446, a control is executed to suppress the function of the ABS and the function of the TCS when the voltage of the power supply decreases. Thus, the function of the ABS and the function of the TCS are stopped when the function of the ABS and the function of the TCS are still usable. Also, if a control is executed to stop operations of actuators in the brake control system in a predetermined sequence, the control is complicated, resulting in an increase in cost. U.S. Pat. No. 5,795,039 A1 mentions that during construction of a brake system it should be considered that control methods may fail if the supplied voltage is lowered. According to this teaching the same actuators "only" perform an electronic brake force distribution, but no longer perform an ABS/TCS, if a failure of a sensor is detected. U.S. Pat. No. 5 795 039 A1 furthermore discloses to monitor the brake system including the supply voltage, the sensors, and so on. When a malfunction of any of the components is detected, the monitoring circuits will intervene to bring the system in a "safe" condition.

SUMMARY OF THE INVENTION

The invention provides a brake control system that makes it possible to control actuators in a simple manner when the voltage of a power supply decreases.

An aspect of the invention relates to a brake control system that includes a power supply portion that supplies a voltage to a plurality of actuators; a first actuator that operates to perform a first function when the first actuator is supplied with a voltage equal to or higher than a first minimum operating voltage from the power supply portion; and a second actuator that operates to perform a second function when the second actuator is supplied with a voltage equal to or higher than a second minimum operating voltage from the power supply portion. The first minimum operating voltage and the second minimum operating voltage are set different from each other by a predetermined value so that the first actuator and the second actuator stop operating in a predetermined sequence with a decrease in the supplied voltage.

According to the aspect, as the voltage of the power supply decreases, the actuators stop operating in the predetermined sequence, although no particular control is executed. Thus, as compared to the case in which the operations of all the actuators are stopped by a control, it is possible to avoid an increase in the cost involved in the control.

In the brake control system according to the above-described aspect, the first minimum operating voltage and the second minimum operating voltage may be set different from each other by the predetermined value so that a first minimum operating voltage range does not overlap a second minimum operating voltage range. In this case, the first minimum operating voltage range is a range of variation in the first minimum operating voltage for the first actuator due to manufacturing variance, and the second minimum operating voltage range is a range of variation in the second minimum operating voltage for the second actuator due to manufacturing variance. Thus, even in the case in which there is variation in the minimum operating voltage due to manufacturing variance, as the voltage of the power supply decreases, the actuators stop operating in the predetermined sequence, although no particular active control is executed.

In the brake control system according to the above-described aspect, a maximum value in the first minimum operating voltage range may be lower than a minimum value in the second minimum operating voltage range. Thus, the first actuator stops operating after the second actuator stops operating.

In the brake control system according to the above-described aspect, the first actuator may include a sensor that detects whether a driver is performing a braking operation; and the second actuator may include a motor that operates a pump, and an electromagnetically-controlled valve that is controlled by controlling an electric current supplied to the electromagnetically-controlled valve. Thus, with a decrease in the voltage of the power supply, the sensor continues to detect whether the driver is performing the braking operation until a time later than a time at which the motor and the electromagnetically-controlled valve stop operating. Accordingly, it is possible to increase the period during which the motor and the electromagnetically-controlled valve are controlled based on the output from the sensor.

In the brake control system according to the above-described aspect, the first actuator may include a first electromagnetically-controlled valve that is normally closed, and when the first electromagnetically-controlled valve is closed, the first electromagnetically-controlled valve may interrupt discharge of operating fluid from a wheel cylinder; and the second actuator may include a second electromagnetically-controlled valve that is normally open, and when the second electromagnetically-controlled valve is closed, the second electromagnetically-controlled valve may interrupt communication between a master cylinder and the wheel cylinder.

Thus, the first electromagnetically-controlled valve stops operating after the second electromagnetically-controlled valve stops operating. Accordingly, it is possible to avoid the situation in which the first electromagnetically-controlled valve stops operating before the second electromagnetically-controlled valve stops operating, and thus, it is possible to avoid the situation in which the hydraulic pressure in the wheel cylinder cannot be decreased.

In the brake control system according to the above-described aspect, the first actuator may control a braking force applied to a front wheel; and the second actuator may control a braking force applied to a rear wheel. Thus, the first actuator for the front wheel stops operating after the second actuator for the rear wheel stops operating.

In the brake control system according to the above-described aspect, the first actuator includes a plurality of first actuators, and at least one of the plurality of first actuators belongs to a first brake system and at least another one of the plurality of first actuators belongs to a second brake system that is separately controlled from the first brake system, and the second actuator includes a plurality of second actuators, and at least one of the plurality of second actuators belongs to the first brake system and at least another one of the plurality of second actuators belongs to the second brake system; a maximum value in the first minimum operating voltage range for the one of the plurality of first actuators belonging to the first brake system may be lower than a minimum value in the first minimum operating voltage range for the another one of the plurality of first actuators belonging to the second brake system; and a maximum value in the second minimum operating voltage range for the one of the plurality of second actuators belonging to the first brake system may be lower than a minimum value in the second minimum operating voltage range for the another one of the plurality of second actuators belonging to the second brake system. Thus, with a decrease in the voltage of the power supply, the actuators belonging to one brake system stop operating before the actuators belonging to the other brake system stop operating.

According to the above-described aspects of the invention, in the brake control system, it is possible to suppress an increase in the cost, and to control the actuators in a simple manner when the voltage of the power supply decreases.

As should be apparent, the invention can provide a number of advantageous features and benefits. It is to be understood that, in practicing the invention, embodiments can be constructed to include one or more features or benefits of embodiments disclosed herein, but not include other features or benefits. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EXEMPLARY EMBODIMENTS

Figure 1:
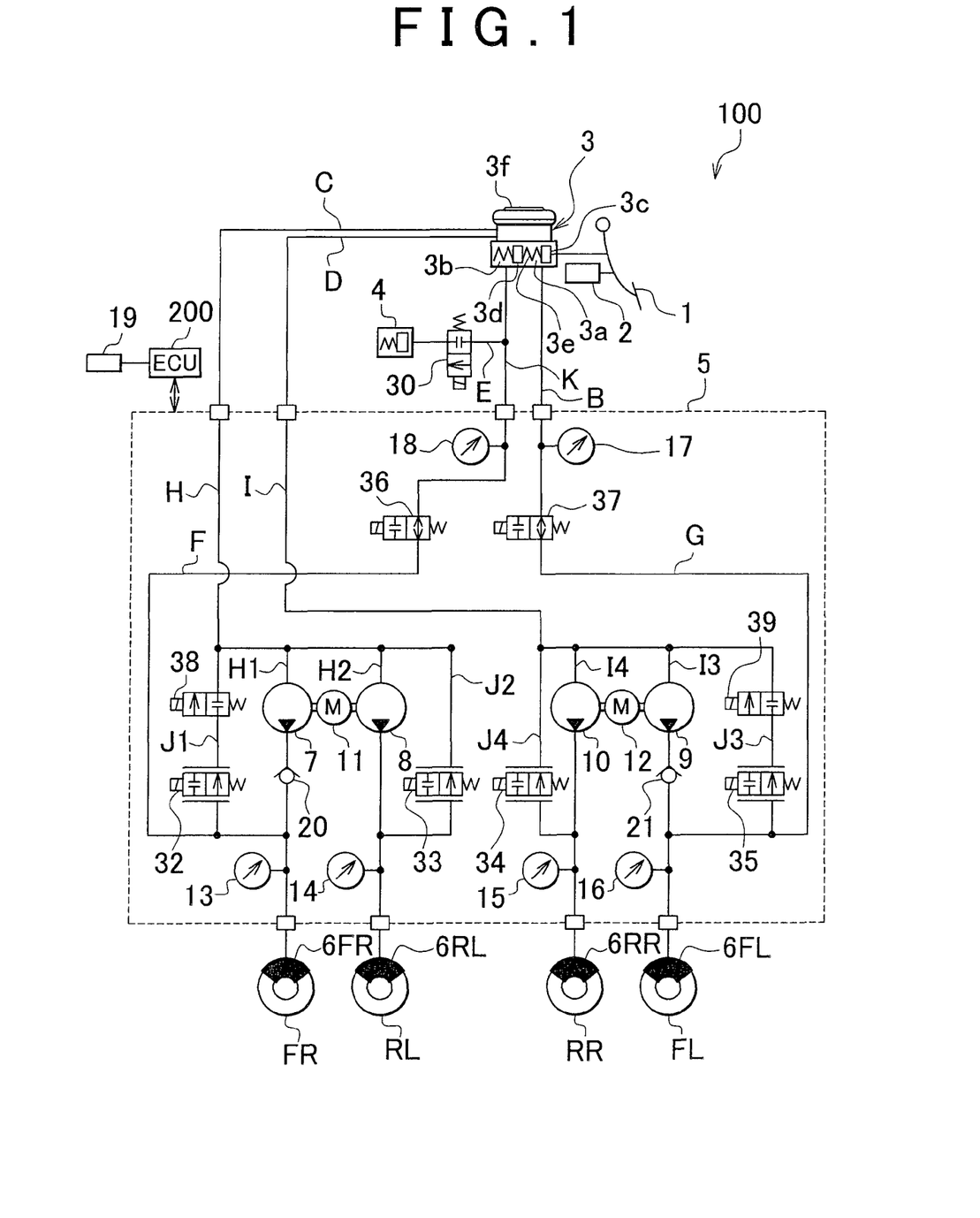
FIG. 1 is a schematic diagram showing a configuration of a brake control system according to an embodiment of the invention.

FIG. 1 is a schematic diagram showing a configuration of a brake control system 100 according to an exemplary embodiment of the invention. FIG. 1 shows an example in which the brake control system 100 according to the embodiment is applied to a vehicle in which hydraulic circuits of a piping system are configured. The piping system can be directed to a piping system for a front-right wheel and a rear-left wheel, and a piping system for a front-left wheel and a rear-right wheel. In the description of the drawings, the same elements are denoted by the same reference numerals, and redundant description thereof will be omitted as appropriate.

As shown in FIG. 1, the brake control system 100 includes a brake pedal 1, a stroke sensor 2, a master cylinder 3, a stroke control valve 30, a stroke simulator 4, a brake hydraulic pressure control actuator 5, a wheel cylinder 6FL, for a front-left wheel FL (hereinafter, may be referred to as "front-left wheel cylinder 6FL"), a wheel cylinder 6FR for a front-right wheel FR (hereinafter, may be referred to as "front-right wheel cylinder 6FR"), a wheel cylinder 6RL for a rear-left wheel RL (hereinafter, may be referred to as "rear-left wheel cylinder 6RL"), and a wheel cylinder 6RR for a rear-right wheel RR (hereinafter, may be referred to as "rear-right wheel cylinder 6RR"). Hereinafter, when the positions of the wheel cylinders are not particularly distinguished from each other, the wheel cylinder(s) will be referred to as "wheel cylinder(s) 6". The brake control system 100 also includes a brake ECU 200. The brake ECU 200 is a control portion that controls portions of the brake control system 100. In the brake control system 100, brake fluid is supplied to the wheel cylinders 6 through the hydraulic circuits. Thus, hydraulic pressures (i.e., wheel cylinder pressures) are supplied to the wheel cylinders 6, and braking forces are applied to the wheels due to the hydraulic pressures. Each wheel cylinder 6 may include a corresponding brake disc (not shown) and a corresponding brake caliper (not shown). A unit including the wheel cylinder, the brake disc, and the brake caliper is referred to as "a disc brake unit".

When a driver depresses the brake pedal 1, a pedal stroke, which is the operation amount of the brake pedal 1, is input to the stroke sensor 2. As a result, the stroke sensor 2 outputs a detection signal corresponding to the pedal stroke. The detection signal is input to the brake ECU 200, and the brake ECU 200 detects the pedal stroke of the brake pedal 1. When a driver depresses the brake pedal 1, a brake light switch 19 changes its states between on-state and off-state, thereby the brake light switch 19 detects whether a driver is performing a brake operation. The detection signal by the brake light switch 19 is also input to the brake ECU 200. In this case, the stroke sensor 2 is employed as an operation amount sensor that detects the operation amount of a brake operating member. However, for example, a depression force sensor that detects a depression force applied to the brake pedal 1 may be employed as the operation amount sensor.

The brake pedal 1 is connected to a push rod or the like that transmits the pedal stroke to a master cylinder 3. When the push rod or the like is pushed, a master cylinder pressure is generated in each of a primary chamber 3a and a secondary chamber 3b of the master cylinder 3.

The master cylinder 3 includes a primary piston 3c and a secondary piston 3d. The primary chamber 3a and the secondary chamber 3b are formed using the primary piston 3c and the secondary piston 3d. The primary piston 3c and the secondary piston 3d receive the elastic force of a spring 3e. Therefore, when the brake pedal 1 is released, each of the pistons 3c and 3d is pressed by the elastic force of the spring 3, and thus the brake pedal 1 returns to an initial position.

A pipe passage B is connected to the primary chamber 3a of the master cylinder 3, and a pipe passage K is connected to the secondary chamber 3b of the master cylinder 3. The pipe passage B and the pipe passage K extend toward the brake hydraulic pressure control actuator 5.

The master cylinder 3 includes a reservoir tank 3f. When the brake pedal 1 is at the initial position, the reservoir tank 3f is connected to the primary chamber 3a and to the secondary chamber 3b through respective passages (not shown). The reservoir tank 3f supplies the brake fluid into the master cylinder 3. Surplus brake fluid in the master cylinder 3 is stored in the reservoir tank 3f. The reservoir tank 3f is connected to pipe passages C and D that extend toward the brake hydraulic pressure control actuator 5.

A stroke simulator 4 is connected to a pipe passage E that is connected to the pipe passage K. The brake fluid flowing from the secondary chamber 3b is stored in the stroke simulator 4. The stroke control valve 30 is provided in the pipe passage E. The stroke control valve 30 is a normally-closed two position valve that opens and closes the pipe passage E, that is, controls the state of the pipe passage E. The stroke control valve 30 controls the flow of the brake fluid to the stroke simulator 4.

A pipe passage F is provided in the brake hydraulic pressure control actuator 5. The pipe passage F is connected to the pipe passage K so that the secondary chamber 3b of the master cylinder 3 is connected to the wheel cylinder 6FR for the front-right wheel FR. A shutoff valve 36 is provided in the pipe passage F. The shutoff valve 36 is a two position valve that is open (to allow the brake fluid to flow) when de-energized, and closed (to interrupt the flow of the brake fluid) when energized. The shutoff valve 36 opens and closes the pipe passage F, that is, controls the state of the pipe passage F, thereby controlling the supply of the brake fluid to the wheel cylinder 6FR through the pipe passages K and F.

A pipe passage G is provided in the brake hydraulic pressure control actuator 5. The pipe passage G is connected to the pipe passage B so that the primary chamber 3a of the master cylinder 3 is connected to the wheel cylinder 6FL for the front-left wheel FL. A shutoff valve 37 is provided in the pipe passage G. The shutoff valve 37 is a two position valve that is open when de-energized, and closed when energized. The shutoff valve 37 opens and closes the pipe passage G, that is, controls the state of the pipe passage G, thereby controlling the supply of the brake fluid to the wheel cylinder 6FL through the pipe passages B and G.

A pipe passage H and a pipe passage I are provided in the brake hydraulic pressure control actuator 5. The pipe passage H is connected to a pipe passage C that extends from the reservoir tank 3f. The pipe passage I is connected to a pipe passage D that extends from the reservoir tank 3f. The pipe passage H branches into two pipe passages H1 and H2. The pipe passage H1 is connected to the front-right wheel cylinder 6FR, and the pipe passage H2 is connected to the rear-left wheel cylinder 6RL. The pipe passage I branches into two pipe passages I3 and I4. The pipe passage I3 is connected to the front-left wheel cylinder 6FL, and the pipe passage I4 is connected to the rear-right wheel cylinder 6RR. As described above, the front-right wheel cylinder 6FR and the front-left wheel cylinder 6FL are the wheel cylinder for the front-right wheel FR and the wheel cylinder for the front-left wheel FL, respectively. The rear-left wheel cylinder 6RL and the rear-right wheel cylinder 6RR are the wheel cylinder for the rear-left wheel RL and the wheel cylinder for the rear-right wheel RR, respectively.

Pumps 7, 8, 9, and 10 are provided in the pipe passages H1, H2, I3, and I4, respectively. Namely, one pump is provided in each of the pipe passages H1, H2, I3, and I4. Each of the pumps 7 to 10 is, for example, a trochoidal pump that does not make much noise. Among the pumps 7 to 10, the two pumps 7 and 8 are operated by a first motor 11, and the two pumps 9 and 10 are operated by a second motor 12. The first motor 11 and the second motor 12 operate the pumps 7 to 10 in accordance with the operation of the brake pedal 1. When the first motor 11 and the second motor 12 operate the pumps 7 to 10, the brake fluid is supplied to the wheel cylinders 6 through the pumps 7 to 10. Hereinafter, when the first motor 11 and the second motor 12 are not particularly distinguished from each other, the first motor 11 and the second motor 12 will be simply referred to as motors. In the embodiment, the four pumps 7 to 10 function as a hydraulic pressure source. The pumps 7 to 10 are provided in the hydraulic circuits. The pumps 7 and 8 supply the brake fluid to the wheel cylinders 6FR, 6RL in accordance with the rotational speed of the first motor 11 connected to the pumps 7 and 8. The pumps 9 and 10 supply the brake fluid to the wheel cylinders 6FL 6RR in accordance with the rotational speed of the second motor 12 connected to the pumps 9 and 10. Namely, two pumps are operated by one motor, and each of the two pumps is connected to one corresponding wheel cylinder. A common battery may supply electric power to the first motor 11 and the second motor 12. When the first motor 11 and the second motor 12 operate the pumps 7 to 10, the pumps 7 to 10 supply the brake fluid to the wheel cylinders 6, thereby applying the wheel cylinder pressures.

Pipe passages J1, J2, J3, and J4 are connected in parallel to the pumps 7, 8, 9, and 10, respectively. A communication valve 38 and a hydraulic pressure adjusting valve 32 are provided in the pipe passage J1 that is connected in parallel to the pump 7. The communication valve 38 and the hydraulic pressure adjusting valve 32 are connected in series to each other. The communication valve 38 and the hydraulic pressure adjusting valve 32 are arranged such that the communication valve 38 is positioned on the side of an intake port of the pump 7 (i.e., the communication valve 38 is positioned at a downstream side of the pipe passage J1 in a direction in which the brake fluid flows), and the hydraulic pressure adjusting valve 32 is positioned on the side of a discharge port of the pump 7 (i.e., the hydraulic pressure adjusting valve 32 is positioned at an upstream side of the pipe passage J1 in the direction in which the brake fluid flows). Namely, the communication valve 38 allows the brake fluid to flow between the reservoir tank 3f and the hydraulic pressure adjusting valve 32, and interrupts the flow of the brake fluid between the reservoir tank 3f and the hydraulic pressure adjusting valve 32. The communication valve 38 is a two position valve that is closed when de-energized, and open when energized. The hydraulic pressure adjusting valve 32 is a normally-open linear valve which is open when de-energized, and closed when energized, and whose opening degree is adjusted by controlling an electric current supplied to the hydraulic pressure adjusting valve 32.

Forces F1, F2, F3, and F4 act on the hydraulic pressure adjusting valve 32. F1 represents an electromagnetic driving force corresponding to the electric current supplied to a linear solenoid (not shown) of the hydraulic pressure adjusting valve 32, F2 represents an urging force of a spring (not shown), F3 represents a pressure-difference acting force corresponding to a pressure difference between an inlet and an outlet (not shown) of the hydraulic pressure adjusting valve 32, and F4 represents a frictional force against the sliding of the solenoid. The opening degree of the hydraulic pressure adjusting valve 32 depends on the value of $\{(F2+F3+F4)-F1\}$. Namely, as the electromagnetic driving force F1 becomes larger, the opening degree of the hydraulic pressure adjusting valve 32 becomes smaller.

Next, a valve-closing current characteristic relating to the hydraulic pressure adjusting valve 32 will be described. The valve-closing current is the value of the electric current supplied to the hydraulic pressure adjusting valve 32 when the hydraulic pressure adjusting valve 32, which has been open, is to be closed. The valve-closing current characteristic is a characteristic showing the relation between the valve-closing current and the wheel cylinder pressure. The valve-closing current characteristic is expressed by a linear function in which the valve-closing current is linearly proportional to the wheel cylinder pressure. The operating fluid flows out from the front-right wheel cylinder 6FR to the hydraulic pressure adjusting valve 32, and flows from the hydraulic pressure adjusting valve 32 toward the communication valve 38 positioned at the downstream side for this out flow. As described above, the hydraulic pressure adjusting valve 32 is a normally-open linear valve. Therefore, as the electric current supplied to the hydraulic pressure adjusting valve 32 increases, the opening degree of the hydraulic pressure adjusting valve 32 decreases, and the flow rate of the hydraulic pressure adjusting valve 32 decreases. When the value of the supplied electric current reaches the valve-closing current, the hydraulic pressure adjusting valve 32 is closed, and the flow rate of the hydraulic pressure adjusting valve 32 is zero.

A hydraulic pressure adjusting valve 33 is provided in the pipe passage J2 that is connected in parallel to the pump 8. The hydraulic pressure adjusting valve 33 is a linear valve, as is the hydraulic pressure adjusting valve 32. Each of the hydraulic pressure adjusting valves 33 to 35 is a normally-open linear valve, and functions in the same manner in which the hydraulic pressure adjusting valve 32 functions. Hereinafter, when the hydraulic pressure adjusting valves 32 to 35 are not particularly distinguished from each other, the hydraulic pressure adjusting valve(s) may be simply referred to as "the hydraulic pressure adjusting valve(s)". When the communication valves 38 and 39 are not particularly distinguished from each other, the communication valve(s) may be simply referred to as "the communication valve(s)".

The communication valve 39 and the hydraulic pressure adjusting valve 35 are provided in the pipe passage J3 that is connected in parallel to the pump 9. The communication valve 39 and the hydraulic pressure adjusting valve 35 are connected in series to each other. The communication valve 39 and the hydraulic pressure adjusting valve 35 are arranged such that the communication valve 39 is positioned on the side of an intake port of the pump 9 (i.e., the communication valve 39 is positioned at a downstream side of the pipe passage J3 in the direction in which the brake fluid flows), and the hydraulic pressure adjusting valve 35 is positioned on the side of a discharge port of the pump 9 (i.e., the hydraulic pressure adjusting valve 35 is positioned at an upstream side of the pipe passage J3 in the direction in which the brake fluid flows). Namely, the communication valve 39 allows the brake fluid to flow between the reservoir tank 3f and the hydraulic pressure adjusting valve 35, and interrupts the flow of the brake fluid between the reservoir tank 3f and the hydraulic pressure adjusting valve 35. The communication valve 39 is a two position valve that is closed when de-energized, and open when energized. The hydraulic pressure adjusting valve 35 is a linear valve that is open when de-energized, and closed when energized, and whose opening degree is adjusted by controlling the electric current supplied to the hydraulic pressure adjusting valve 35. The opening degree of the hydraulic pressure adjusting valve 35 is adjusted by controlling the electric current supplied to the hydraulic pressure adjusting valve 35, and the amount of the brake fluid in the front-left wheel cylinder 6FL is adjusted by adjusting the opening degree of the hydraulic pressure adjusting valve 35. By controlling the electric current supplied to the hydraulic pressure adjusting valve and the communication valve, the opening degrees of the hydraulic pressure adjusting valve and the communication valve are adjusted to control the discharge of the brake fluid from the wheel cylinder 6.

The hydraulic pressure adjusting valve 34 is provided in the pipe passage J4 that is connected in parallel to the pump 10. The hydraulic pressure adjusting valve 34 is a linear valve, as is the hydraulic pressure adjusting valve 35.

A hydraulic pressure sensor 13 is disposed in the pipe passage H1 at a position between the pump 7 and the wheel cylinder 6FR. A hydraulic pressure sensor 14 is disposed in the pipe passage H2 at a position between the pump 8 and the wheel cylinder 6RL. A hydraulic pressure sensor 15 is disposed in the pipe passage I4 at a position between the pump 10 and the wheel cylinder 6RR. A hydraulic pressure sensor 16 is disposed in the pipe passage I3 at a position between the pump 9 and the wheel cylinder 6FL. The hydraulic pressure sensor 13 detects the hydraulic pressure in the wheel cylinder 6FR. The hydraulic pressure sensor 14 detects the hydraulic pressure in the wheel cylinder 6RL. The hydraulic pressure sensor 15 detects the hydraulic pressure in the wheel cylinder 6RR. The hydraulic pressure sensor 16 detects the hydraulic pressure in the wheel cylinder 6FL. A hydraulic pressure sensor 17 is disposed in the pipe passage G at a position upstream of the shutoff valve 37 (i.e., at a position between the shutoff valve 37 and the master cylinder 3). A hydraulic pressure sensor 18 is disposed in the pipe passage F at a position upstream of the shutoff valve 36 (i.e., at a position between the shutoff valve 36 and the master cylinder 3). The hydraulic pressure sensor 17 detects the master cylinder pressure generated in the primary chamber 3a of the master cylinder 3, and the hydraulic pressure sensor 18 detects the master cylinder pressure generated in the secondary chamber 3b of the master cylinder 3.

A check valve 20 is provided at the discharge port of the pump 7 for applying a pressure to the front-right wheel cylinder 6FR. A check valve 21 is provided at the discharge port of the pump 9 for applying a pressure to the front-left wheel cylinder 6FL. The check valve 20 is provided to prohibit the flow of the brake fluid from the front-right wheel cylinder 6FR toward the pump 7. The check valve 21 is provided to prohibit the flow of the brake fluid from the front-left wheel cylinder 6FL toward the pump 9. The brake hydraulic pressure control actuator 5 is thus configured.

In the brake control system 100 with the above-described configuration, a first piping system includes: i) a hydraulic circuit including lines that connect the reservoir tank 3f to the front-right wheel cylinder 6FR and the rear-left wheel cylinder 6RL through the pipe passages C, H, H1, and H2, and lines of the pipe passages J1 and J2 that are connected in parallel to the pumps 7 and 8, respectively; and ii) a hydraulic circuit that connects the secondary chamber 3b to the front-right wheel cylinder 6FR through the pipe passages K and F.

A second piping system includes: i) a hydraulic circuit including lines that connect the reservoir tank 3f to the front-left wheel cylinder 6FL and the rear-right wheel cylinder 6RR through the pipe passages D, I, I3, and I4, and lines of the pipe passages J3 and J4 that are connected in parallel to the pumps 9 and 10, respectively; and ii) a hydraulic circuit that connects the primary chamber 3a to the front-left wheel cylinder 6FL through the pipe passages B and G.

The detection signals output from the stroke sensor 2 and the hydraulic pressure sensors 13 to 18 are input to the brake ECU 200. The brake ECU 200 outputs control signals for operating the stroke control valve 30, the shutoff valves 36 and 37, the communication valves 38 and 39, the hydraulic pressure adjusting valves 32 to 35, the first motor 11, and the second motor 12, based on the pedal stroke, the hydraulic pressures in the wheel cylinders 6, and the master cylinder pressures that are determined based on the detection signals.

Normally, when the brake pedal 1 is depressed, and the detection signals output from the stroke sensor 2 and the hydraulic pressure sensors 17 and 18 are input to the brake ECU 200, the brake ECU 200 controls the electromagnetically-controlled valves 30 and 32 to 39, and the first and second motors 11 and 12 as follows. Both of the shutoff valves 36 and 37 are energized, and both of the communication valves 38 and 39 are energized. Thus, each of the shutoff valves 36 and 37 is closed to interrupt the flow of the brake fluid, and each of the communication valves 38 and 39 is opened to allow the brake fluid to flow.

Also, the opening degree of each of the hydraulic pressure adjusting valves 32 to 35 is adjusted in accordance with the value of the electric current supplied thereto. The stroke control valve 30 is energized, and therefore, communication is provided between the stroke simulator 4 and the secondary chamber 3b through the pipe passages K and E. Thus, when the brake pedal 1 is depressed and the pistons 3c and 3d move, the brake fluid flows from the secondary chamber 3b to the stroke simulator 4. This prevents the driver from feeling that the brake pedal 1 is stiff due to high master cylinder pressures when the driver depresses the brake pedal 1.

Further, both of the first motor 11 and the second motor 12 are energized, and the brake fluid flows out from the pumps 7 to 10 to the wheel cylinders 6 without passing through the electromagnetically-controlled valves. Namely, when the pumps 7 to 10 operate, the brake fluid is supplied to the wheel cylinders 6.

The brake ECU 200 controls the rotational speed of each of the first motor 11 and the second motor 12, thereby controlling the amount of the brake fluid supplied to each wheel cylinder 6. Because each of the shutoff valves 36 and 37 is in the closed state to interrupt the flow of the brake fluid, the hydraulic pressure on the downstream side of each of the pumps 7 to 10 is increased, that is, the amount of the brake fluid supplied to each wheel cylinder 6 is increased. Further, because each of the communication valves 38 and 39 is in the open state to allow the brake fluid to flow, and the opening degree of each of the hydraulic pressure adjusting valves 32 to 35 is controlled, the brake fluid is discharged from each wheel cylinder 6 in accordance with the opening degree of the corresponding hydraulic pressure adjusting valve 32, 33, 34, 35. Thus, the hydraulic pressure in each wheel cylinder 6 is adjusted.

The brake ECU 200 monitors the hydraulic pressure supplied to each wheel cylinder 6 based on the detection signal output from each of the hydraulic pressure sensors 13 to 16, and controls the value of the electric current supplied to each of the hydraulic pressure adjusting valves 32 to 35 so that the hydraulic pressure in each wheel cylinder 6 is equal to a desired value. Thus, braking forces are generated in accordance with the pedal stroke of the brake pedal 1. The brake control system 100 in the embodiment executes the brake control in the above-described manner.

In the brake control system 100, the actuators including the pumps 7 to 10, the electromagnetically-controlled valves 30 and 32 to 39, the motors 11 and 12, and the brake light switch 19 operate using power from a battery (not shown) that functions as a power supply. Therefore, if a voltage required to operate the actuators cannot be supplied due to a malfunction of the battery, the actuators cannot operate. In this case, it is preferable to maintain the function(s) of the important actuator(s) to execute the brake control to the extent possible.

Accordingly, there has been proposed a method in which priorities are assigned to actuators, and when the voltage of a power supply decreases, the operations of the actuators are stopped in a predetermined sequence according to the voltage of the power supply. However, if the operations of all the actuators are stopped by a control, the control is complicated, and the cost is increased. In addition, if the operation of each of the actuators is stopped by a control, even an actuator that is still operable may be stopped by the control. This situation will be more specifically described with reference to FIG. 2.

Figure 2:
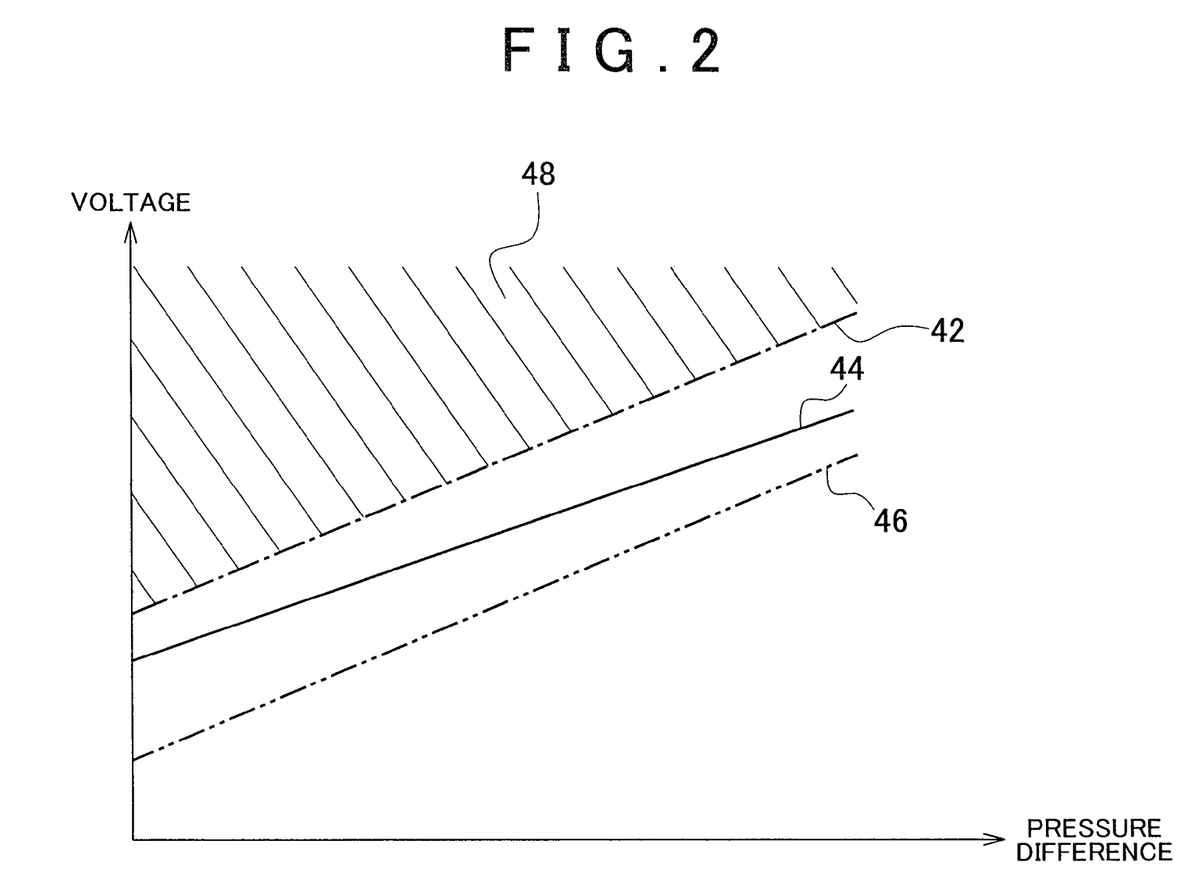
FIG. 2 is a diagram used for explaining a control that stops the operation of a hydraulic pressure adjusting valve in related art.

FIG. 2 is a diagram used for explaining a control that stops the operation of a hydraulic pressure adjusting valve in related art. In FIG. 2, the axis of ordinate indicates a voltage, and the axis of abscissa indicates a pressure difference between an inlet and an outlet of a hydraulic pressure adjusting valve. In FIG. 2, a solid line indicates a minimum operating voltage 44 for the hydraulic pressure adjusting valve, a chain line indicates a maximum value 42 in a minimum operating voltage range for the hydraulic pressure adjusting valve, and a two-dot chain line indicates a minimum value 46 in the minimum operating voltage range for the hydraulic pressure adjusting valve.

The minimum operating voltage is the minimum voltage value at or above which an actuator is operable. If a voltage supplied to the actuator is lower than the minimum operating voltage, the actuator does not operate. Namely, if a voltage equal to or higher than the minimum operating voltage is supplied from a power supply portion to the actuator, the actuator operates, that is, the actuator performs a function. The minimum operating voltage range is a range of variation in the minimum operating voltage due to manufacturing variance. Although each actuator is manufactured so that the actuator is operable at or above a predetermined minimum operating voltage, the minimum operating voltage varies among the manufactured actuators. Thus, the range of variation in the minimum operating voltage is referred to as the minimum operating voltage range. The minimum operating voltage range is empirically set based on the minimum operating voltage set at the time of manufacturing.

The minimum operating voltage 44 for the normally-open hydraulic pressure adjusting valve changes in accordance with the pressure-difference acting force corresponding to the pressure difference between the inlet and the outlet of the hydraulic pressure adjusting valve. As shown in FIG. 2, when the pressure difference between the inlet and the outlet of the hydraulic pressure adjusting valve increases, the pressure-difference acting force acts in such a direction as to open the hydraulic pressure adjusting valve, and therefore, the minimum operating voltage 44 increases.

In the case that the operation of the hydraulic pressure adjusting valve is stopped by a control when the voltage of the power supply decreases, it is necessary to set a stop voltage at which the operation of the actuator should be stopped. In the related art, the stop voltage is set to the maximum voltage 42 in the minimum operating voltage range, taking into account the minimum operating voltage range. Accordingly, when the voltage supplied to the hydraulic pressure adjusting valve is in a region 48, that is, when the voltage supplied to the hydraulic pressure adjusting valve is higher than the maximum value 42 in the minimum operating voltage range, the hydraulic pressure adjusting valve operates.

In the related art, although the hydraulic pressure adjusting valve is operable until the voltage decreases to the minimum operating voltage 44, the operation of the hydraulic pressure adjusting valve is stopped at the maximum value 42 in the minimum operating voltage range. This decreases the robustness against a decrease in the voltage of the power supply. Namely, there is a difference between the maximum value 42 in the minimum operating voltage range, at which the operation of the hydraulic pressure adjusting valve is stopped, and the minimum operating voltage 44 at which the hydraulic pressure adjusting valve is still operable. Thus, the capability of the hydraulic pressure adjusting valve is not used to the fullest extent possible. In contrast, if the operation of the hydraulic pressure adjusting valve is not stopped by the control, the capability of the hydraulic pressure adjusting valve is used to the fullest extent possible.

Figure 3:
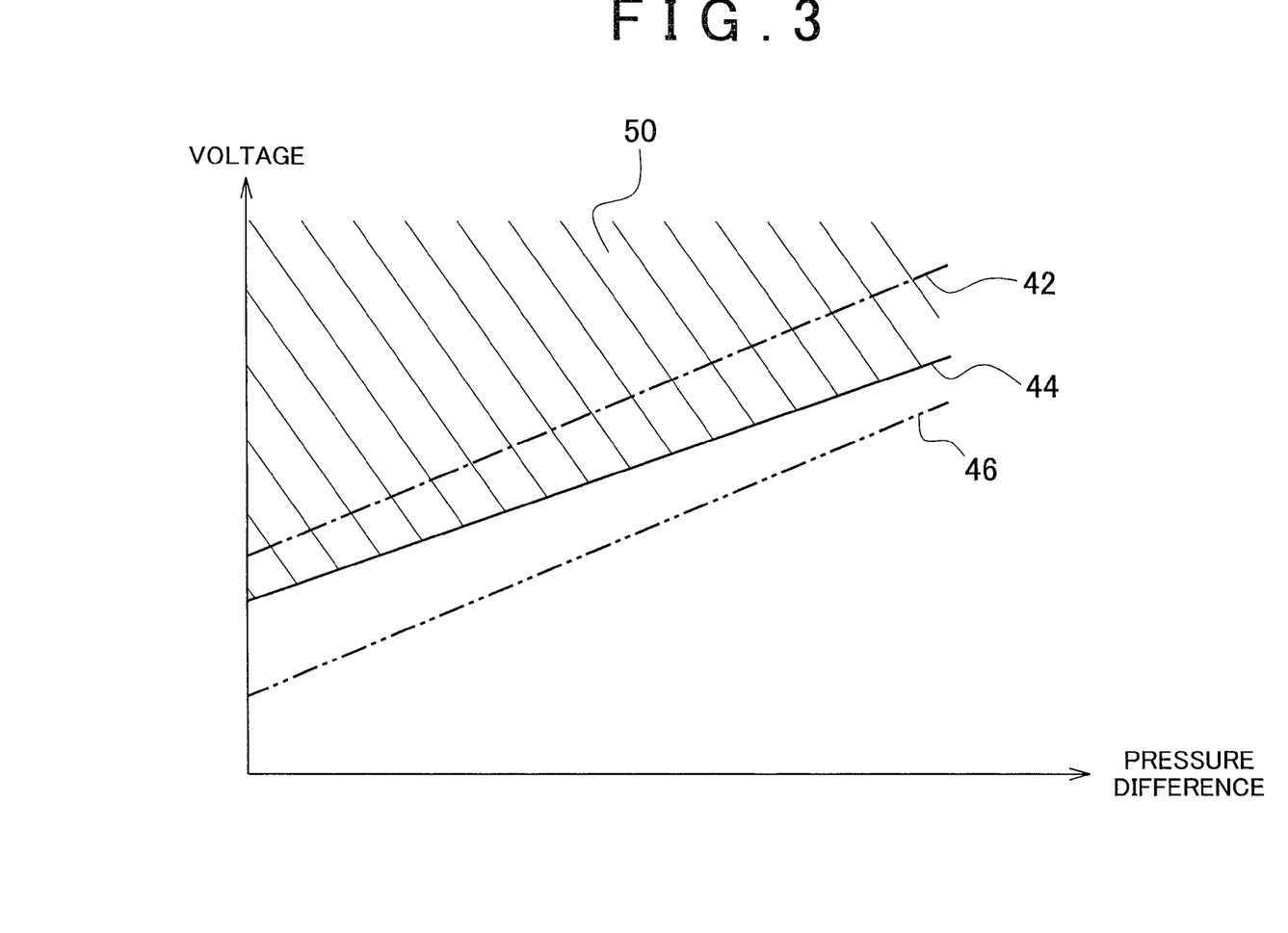
FIG. 3 is a diagram used for explaining a manner in which a hydraulic pressure adjusting valve stops operating in the embodiment.

FIG. 3 is a diagram used for explaining a manner in which the hydraulic pressure adjusting valve stops operating in the present embodiment. In FIG. 3, the axis of ordinate indicates the voltage, and the axis of abscissa indicates the pressure difference between the inlet and the outlet of the hydraulic pressure adjusting valve. In the brake control system 100 according to the embodiment, when the voltage of the power supply decreases, basically, the control that stops the operations of the actuators is not executed. As the voltage of the power supply decreases, the actuators stop operating in a predetermined sequence, although no particular active control is executed.

Accordingly, when the voltage supplied to the hydraulic pressure adjusting valve is in a region 50, that is, when the voltage supplied to the hydraulic pressure adjusting valve is equal to or higher than the minimum operating voltage 44, the hydraulic pressure adjusting valve operates. Thus, as compared to the related art shown in FIG. 2, the voltage region in which the hydraulic pressure adjusting valve operates is increased by the difference between the maximum value 42 in the minimum operating voltage range and the minimum operating voltage 44, and thus the robustness is increased.

In the embodiment, a first minimum operating voltage for a first actuator and a second minimum operating voltage for a second actuator are set to be different from each other by a predetermined value so that the first actuator and the second actuator stop operating in a predetermined sequence when the supplied voltage decreases. Also, in the brake control system 100, a first minimum operating voltage range for the first actuator does not overlap a second minimum operating voltage range for the second actuator so that the first actuator and the second actuator stop operating in the predetermined sequence when the supplied voltage decreases. Namely, the first minimum operating voltage for the first actuator and the second minimum operating voltage for the second actuator are set to be different from each other by the predetermined value so that the first minimum operating voltage range for the first actuator does not overlap the second minimum operating voltage range for the second actuator. Thus, with a decrease in the voltage of the power supply, the actuators stop operating in the predetermined sequence, although no active control that stops the operations of the actuators is executed. The predetermined value by which the first minimum operating voltage is different from the second minimum operating voltage (i.e., the predetermined difference between the first minimum operating voltage and the second minimum operating voltage) is set based on the first minimum operating voltage range for the first actuator and the second minimum operating voltage range for the second actuator. Namely, the predetermined voltage difference is set based on the variation in the first minimum operating voltage due to manufacturing variance, and the variation in the second minimum operating voltage due to manufacturing variance.

Figure 4:
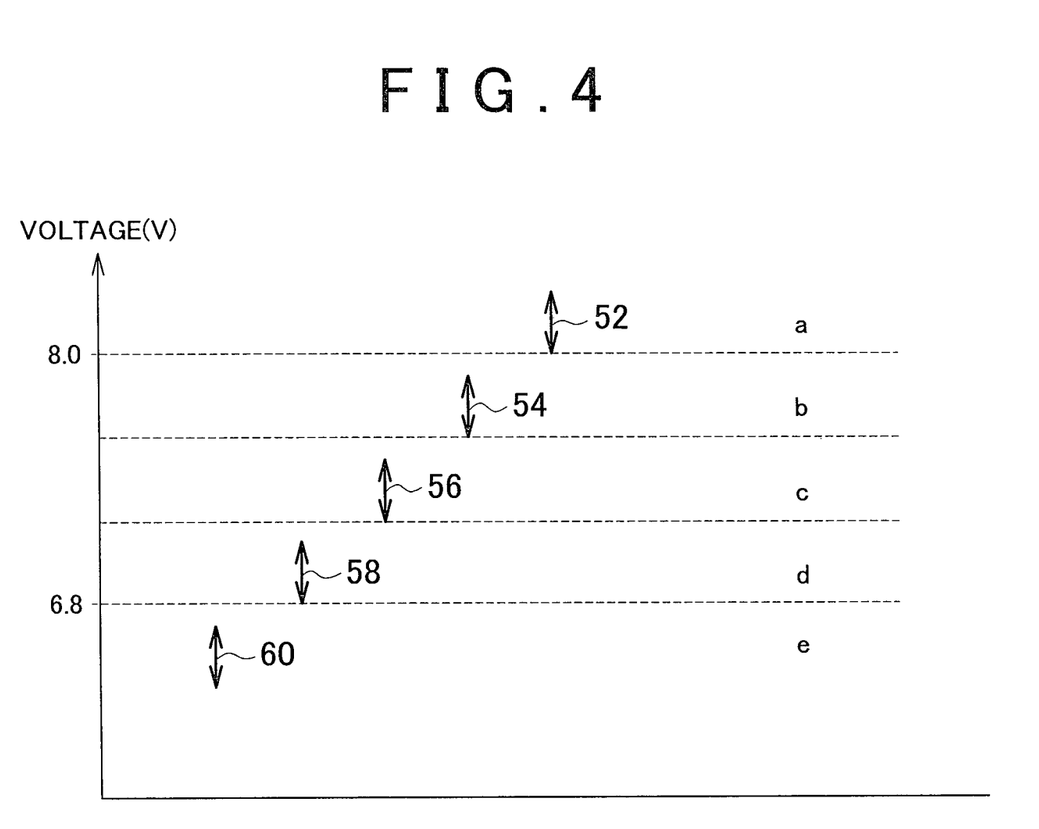
FIG. 4 is a diagram showing a relation among minimum operating voltage ranges for actuators in the embodiment.

FIG. 4 is a diagram used for explaining the relation among the minimum operating voltage ranges for the actuators in the embodiment. FIG. 4 shows a minimum operating voltage range 52 for the shutoff valves 36 and 37, a minimum operating voltage range 54 for the communication valves 38 and 39, a minimum operating voltage range 56 for the hydraulic pressure adjusting valves 32 to 35, a minimum operating voltage range 58 for the motors 11 and 12, and a minimum operating voltage range 60 for the brake light switch 19. Thus, when the voltage of the power supply decreases, the actuators stop operating in the predetermined sequence. More specifically, when the voltage of the power supply decreases, the shutoff valves 36 and 37, the communication valves 38 and 39, the hydraulic pressure adjusting valves 32 to 35, the motors 11 and 12, and the brake light switch 19 stop operating in this stated sequence.

In the brake control system 100 according to the embodiment, the minimum operating voltage ranges 52 to 60 for the actuators do not overlap each other. For example, when the minimum operating voltage range 52 for the shutoff valves 36 and 37 (i.e., the second actuator) is compared with the minimum operating voltage range 54 for the communication valves 38 and 39 (i.e., the first actuator), the maximum value in the first minimum operating voltage range for the first actuator is lower than the minimum value in the second minimum operating voltage range for the second actuator. Thus, with a decrease in the voltage of the power supply, the actuators stop operating in the predetermined sequence. It is to be noted that the actuator that has the minimum operating voltage range (i.e., the second minimum operating voltage range) higher than the first minimum operating voltage range for the first actuator is regarded as the second actuator.

Hereinafter, the brake control in each of stages "a" to "e" will be described on the assumption that the minimum operating voltage for each actuator is equal to the minimum value in the minimum operating voltage range. First, at the stage "a", the brake control is executed in a normal manner.

Next, at the stage "b", the normally-open shutoff valves 36 and 37 stop operating, and as a result, communication is provided between the master cylinder 3 and the front-right wheel cylinder 6FR, and between the master cylinder 3 and the front-left wheel cylinder 6FL. Accordingly, the hydraulic pressure is supplied from the master cylinder 3 to the front-right wheel cylinder 6FR and the front-left wheel cylinder 6FL, according to the amount by which the driver depresses the brake pedal 1. Further, the hydraulic pressure adjusting valves 32 to 35 and the communication valves 38, 39 are controllable. Therefore, in the brake control system 100, the operation performed by the driver is detected using the brake light switch 19, and then, the motors 11 and 12 are operated according to the detected operation performed by the driver, and the wheel cylinder pressures are adjusted using the hydraulic pressure adjusting valves 32 to 35 and the communication valves 38, 39. Namely, the brake control system 100 executes the brake control by applying the hydraulic pressures from the master cylinder 3, and applying the hydraulic pressures by operating the motors 11 and 12.

Next, at the stage "c", the normally-closed communication valves 38 and 39 stop operating. Therefore, the communication between the hydraulic pressure adjusting valves 32 and 35 for the front wheels and the reservoir tank 3*f* is interrupted. At this stage as well, the brake control system 100 executes the brake control by applying the hydraulic pressures from the master cylinder 3, and applying the hydraulic pressures by operating the motors 11 and 12 according to the output from the brake light switch 19. In the brake control, the hydraulic pressure adjusting valves 32 and 35 cannot be used to adjust the wheel cylinder pressures for the front wheels, although the hydraulic pressure adjusting valves 33 and 34 for the rear wheels can be used to adjust the wheel cylinder pressures for the rear wheels. Thus, the wheel cylinder pressures for the front wheels may be adjusted by adjusting the rotational speeds of the motors 11 and 12.

Next, at the stage "d", the normally-open hydraulic pressure adjusting valves 32 to 35 stop operating. Thus, the hydraulic pressure adjusting valves 33 and 34, which can be used at the stage "c", cannot be used to adjust the wheel cylinder pressures for the rear wheels at the stage "d". At the stage "d", the wheel cylinders for the front wheels are controlled by applying the hydraulic pressures from the master cylinder 3, and applying the hydraulic pressures by operating the motors 11 and 12 according to the output from the brake light switch 19. In contrast, the wheel cylinder pressures for the rear wheels are controlled as follows. Target hydraulic pressures are calculated based on the output(s) from the stroke sensor 2 or the hydraulic pressure sensors 17 and 18, the rotational speeds of the motors 11 and 12 are calculated based on the target hydraulic pressures, and the wheel cylinder pressures for the rear wheels are controlled by applying the hydraulic pressures by operating the motors 11 and 12.

Next, at the stage "e", the motors 11 and 12 stop operating. At the stage "e", the wheel cylinder pressures for the front wheels are controlled by applying the hydraulic pressures from the master cylinder 3.

Because the actuators stop operating in the predetermined sequence as described above, it is possible to increase the period during which the brake control system 100 continues to execute the brake control when the voltage of the power supply decreases.

When taking into account the relation between the stages "a" to "d" and the stage "e", the first actuator is the sensor that detects whether the driver is performing the braking operation, for example, the brake light switch 19, and the second actuator includes the motors 11 and 12 that operate the pumps 7 to 10, and the electromagnetically-controlled valves 30 and 32 to 39 that are controlled by controlling the electric current supplied to the electromagnetically-controlled valves 30 and 32 to 39. With the above-described configuration, with a decrease in the voltage of the power supply, it is possible to maintain the operation of the brake light switch 19 to detect the operation performed by the driver, until the end of the brake control. Thus, it is possible to increase the period during which the brake control system 100 continues to execute the brake control by operating the motors 11 and 12 according to the operation performed by the driver, with a decrease in the voltage of the power supply.

When taking into account the relation between the stage "a" and the stage "b", the first actuator includes first electromagnetically-controlled valves that are normally closed, and the second actuator includes second electromagnetically-controlled valves that are normally open. When the first electromagnetically-controlled valves are closed, the first electromagnetically-controlled valves interrupt the discharge of the operating fluid from the wheel cylinders. When second electromagnetically-controlled valves are closed, the second electromagnetically-controlled valves interrupt the communication between the master cylinder 3 and the wheel cylinders 6. Namely, the first actuator includes the communication valves 38 and 39, and the second actuator includes the shutoff valves 36 and 37. Thus, as compared to the case in which the communication valves 38 and 39 stop operating before the shutoff valves 36 and 37 stop operating, it is possible to reduce the possibility that the braking forces larger than required are generated. More specifically, if the communication valves 38 and 39 are closed before the shutoff valves 36 and 37 are opened, the hydraulic pressures in the front-right wheel cylinder 6FR and the front-left wheel cylinder 6FL cannot be decreased, and therefore, braking forces larger than required may be generated. However, with the above-described configuration, it is possible to reduce the possibility that braking forces larger than required are generated.

As shown in FIG. 1, the brake control system 100 includes two brake systems that are separately controlled. For example, the brake control system 100 includes a first brake system that supplies the operating fluid to the front-right wheel cylinder 6FR provided at the front-right wheel FR, and the rear-left wheel cylinder 6RL provided at the rear-left wheel RL; and a second brake system that supplies the operating fluid to the front-left wheel cylinder 6FL provided at the front-left wheel FL, and the rear-right wheel cylinder 6RR provided at the rear-right wheel RR. Each of the actuators excluding the brake light switch 19 belongs to one of the first brake system and the second brake system.

Accordingly, in the brake control system 100 according to the embodiment, the actuators stop operating in the sequence shown in FIG. 4, and in addition, the maximum value in the first minimum operating voltage range for the first actuator belonging to the first brake system is lower than the minimum value in the first minimum operating voltage range for the first actuator belonging to the second brake system. Also, in the brake control system 100 according to the embodiment, the maximum value in the second minimum operating voltage range for the second actuator belonging to the first brake system is lower than the minimum value in the second minimum operating voltage range for the second actuator belonging to the second brake system. Thus, the minimum operating voltage for the actuator belonging to the first brake system is lower than the minimum operating voltage for the actuator belonging to the second brake system. Accordingly, it is possible to delay the stop of the operation of the actuator belonging to the first brake system. When the voltage of the power supply decreases, the actuator belonging to one brake system stops operating to decrease power consumption, before the actuator belonging to the other brake system stops operating. As a result, it is possible to delay the stop of the operation of the actuator belonging to the other brake system.

Next, a modified example of the brake control system 100 according to the embodiment will be described. In the brake control system 100, the first minimum operating voltage range for the first actuator is different from the second minimum operating voltage range for the second actuator. The first actuator controls the braking forces applied to the front wheels, and the second actuator controls the braking forces applied to the rear wheels. The maximum value in the first minimum operating voltage range for the first actuator for the front wheels is lower than the minimum value in the second minimum operating voltage range for the second actuator for the rear wheels. More specifically, the maximum value in the minimum operating voltage range for the hydraulic pressure adjusting valves 32 and 35 is lower than the minimum value in the minimum operating voltage range for the hydraulic pressure adjusting valves 33 and 34. With this configuration, with a decrease in the voltage of the power supply, it is possible to delay the stop of the brake control for the front wheels. Because an inertia force of the vehicle acts on the front wheels, the braking forces applied to the front wheels need to be larger than the braking forces applied to the rear wheels. Therefore, it is preferable to increase the period during which the brake control system 100 continues to execute the brake control for the front wheels.

Even when the minimum operating voltage is set as described above, there is a possibility that the actuators may not stop operating in the predetermined sequence due to disturbance such as a temperature change, with a decrease in the voltage of the power supply. For example, the minimum operating voltage for the hydraulic pressure adjusting valves 32 to 35 may greatly change due to a temperature change. Therefore, the brake ECU 200 may execute a control that stops the operations of the hydraulic pressure adjusting valves 32 to 35 so that the operations of the actuators are stopped in the sequence shown in FIG. 4. For example, opening degree sensors (not shown) may be provided at the respective hydraulic pressure adjusting valves 32 to 35, and when it is detected that at least one of the hydraulic pressure adjusting valves 32 to 35 stops operating, the brake ECU 200 may execute a control that stops the operations of the other three hydraulic pressure adjusting valves. Also, the brake ECU 200 may estimate whether at least one of the hydraulic pressure adjusting valves 32 to 35 stops operating, based on values detected by the hydraulic pressure sensors 13 to 16, without using the opening degree sensors. Thus, it is possible to more reliably stop the operations of the actuators in the predetermined sequence. Also, as compared to the case in which the brake ECU 200 executes a control that stops the operations of all the actuators when the voltage of the power supply decreases, the control is simple, and the increase in the cost is suppressed.

The brake ECU 200 may monitor whether the actuators stop operating in the predetermined sequence when the voltage of the power supply decreases, and if the brake ECU 200 determines that at least one actuator, which should stop operating, is still operating, the brake ECU 200 may execute a control that stops the operation of that at least one actuator.

More specifically, if the communication valves 38 and 39 (i.e., the first actuator) have stopped operating and the shutoff valves 36 and 37 (i.e., the second actuator) have not stopped operating, the actuators have stopped operating in a sequence different from the predetermined sequence shown in FIG. 4. Therefore, the brake ECU 200 can actively perform a control to stop the operations of the shutoff valves 36 and 37 to place the brake control system 100 in the state at the stage "c". If the communication valves 38 and 39 have stopped operating and the shutoff valves 36 and 37 have not stopped operating, the operating fluid for the front wheels is not discharged. Therefore, the brake ECU 200 can determine whether the actuators have stopped operating in an abnormal sequence, by comparing the outputs from the hydraulic pressure sensors 13 and 16 for the front wheels, with the outputs from the hydraulic pressure sensors 14 and 15 for the rear wheels.

If the brake ECU 200 cannot determine whether the first actuator has stopped operating, the brake ECU 200 can execute an active control that stops the operation of the second actuator that should stop operating before the first actuator stops operating. Thus, in the brake control system 100, it is possible to reduce the possibility that the actuators stop operating in a sequence different from the predetermined sequence. Accordingly, it is possible to execute a safer brake control.

The embodiment can be applied not only to the brake control system shown in FIG. 1, but also to other brake control systems.

While the exemplary embodiments have been described, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less, or only a single element, are also within the spirit and scope of the invention.

Obviously, numerous modifications and variations of the present invention are possible in light of the above teachings. It is therefore to be understood that within the scope of the appended claims, the invention may be practiced otherwise than as specifically described herein.

The invention claimed is:

1. A brake control system comprising:
a power supply portion that supplies a voltage to a plurality of actuators;
a first actuator that operates to perform a first function when the first actuator is supplied with a voltage equal to or higher than a first minimum operating voltage from the power supply portion; and
a second actuator that operates to perform a second function when the second actuator is supplied with a voltage equal to or higher than a second minimum operating voltage from the power supply portion, wherein
the first actuator has a first normal position when no power is supplied to the first actuator,
the second actuator has a second normal position when no power is supplied to the second actuator, and
the first minimum operating voltage and the second minimum operating voltage are set different from each other by a predetermined value so that the first actuator is in the first normal position and the second actuator is in the second normal position in a predetermined sequence with a decrease in the supplied voltage.

2. The brake control system according to claim 1, wherein a maximum value in the first minimum operating voltage range is lower than a minimum value in the second minimum operating voltage range.

3. The brake control system according to claim 1, wherein the first actuator includes a sensor that detects whether a driver is performing a braking operation; and
the second actuator includes a motor that operates a pump, and an electromagnetically-controlled valve that is controlled by controlling an electric current supplied to the electromagnetically-controlled valve.

4. The brake control system according to claim 1, wherein the first actuator includes a first electromagnetically-controlled valve that is normally closed, and when the first electromagnetically-controlled valve is closed, the first electromagnetically-controlled valve interrupts discharge of operating fluid from a wheel cylinder; and
the second actuator includes a second electromagnetically-controlled valve that is normally open, and when the second electromagnetically-controlled valve is closed, the second electromagnetically-controlled valve interrupts communication between a master cylinder and the wheel cylinder.

5. The brake control system according to claim 1, wherein the first actuator controls a braking force applied to a front wheel; and the second actuator controls a braking force applied to a rear wheel.

6. The brake control system according to claim 1, wherein
the first minimum operating voltage and the second minimum operating voltage are set different from each other by the predetermined value so that a first minimum operating voltage range does not overlap a second minimum operating voltage range; and the first minimum operating voltage range is a range of variation in the first minimum operating voltage for the first actuator due to manufacturing variance, and the second minimum operating voltage range is a range of variation in the second minimum operating voltage for the second actuator due to manufacturing variance.

7. The brake control system according to claim 6, wherein
the first actuator includes a plurality of first actuators, and
at least one of the plurality of first actuators belongs to a first brake system and at least another one of the plurality of first actuators belongs to a second brake system that is separately controlled from the first brake system, and the second actuator includes a plurality of second actuators, and at least one of the plurality of second actuators belongs to the first brake system and at least another one of the plurality of second actuators belongs to the second brake system;

a maximum value in the first minimum operating voltage range for the one of the plurality of first actuators belonging to the first brake system is lower than a minimum value in the first minimum operating voltage range for the another one of the plurality of first actuators belonging to the second brake system; and a maximum value in the second minimum operating voltage range for the one of the plurality of second actuators belonging to the first brake system is lower than a minimum value in the second minimum operating voltage range for the another one of the plurality of second actuators belonging to the second brake system.

8. The brake control system according to claim 1, wherein the first function is a determination of whether a driver performed a braking operation.

* * * * *